United States Patent [19]

Zboril

[11] Patent Number: 4,666,994

[45] Date of Patent: May 19, 1987

[54] COLOR OF POLYMERS

[75] Inventor: Vaclav G. Zboril, Kingston, Canada

[73] Assignee: Du Pont Canada Inc., Mississauga, Canada

[21] Appl. No.: 847,309

[22] Filed: Apr. 2, 1986

[30] Foreign Application Priority Data

Apr. 12, 1985 [GB] United Kingdom ............... 8509452

[51] Int. Cl.$^4$ ............................................. C08F 8/42
[52] U.S. Cl. ..................................... 525/370; 524/398
[58] Field of Search ........................ 525/370; 524/398

[56] References Cited

U.S. PATENT DOCUMENTS

| | | | |
|---|---|---|---|
| 2,985,604 | 5/1961 | Koehler et al. | 525/370 |
| 3,267,083 | 8/1966 | Imhof | 525/370 |
| 3,435,019 | 3/1969 | Goebel et al. | 528/490 |
| 3,984,610 | 10/1976 | Elston | 526/169 |
| 4,158,714 | 6/1979 | Brichta et al. | 528/425 |
| 4,311,816 | 1/1982 | Mollison et al. | 526/116 |
| 4,376,065 | 3/1983 | Shipley et al. | 526/114 |
| 4,381,382 | 4/1983 | Shipley et al. | 526/348.2 |
| 4,430,488 | 2/1984 | Zgoril | 526/84 |

FOREIGN PATENT DOCUMENTS

| | | | |
|---|---|---|---|
| 660869 | 4/1963 | Canada . | |
| 1165499 | 4/1984 | Canada . | |
| 1171065 | 7/1984 | Canada | 252/97 |
| 1171066 | 7/1984 | Canada | 252/109 |
| 1173599 | 8/1984 | Canada | 402/605 |
| 1007753 | 10/1965 | United Kingdom | 524/398 |

*Primary Examiner*—Joseph L. Schofer
*Assistant Examiner*—N. Sarofin

[57] ABSTRACT

A polymerization process, especially a solution polymerization process, for the preparation of high molecular weight polymers of alpha-olefins less susceptible to yellowness is disclosed. The process comprises feeding monomer(s), coordination catalyst and optionally inert hydrocarbon solvent to a reactor, polymerizing the monomers at a temperature of up to 320° C. and deactivating the catalyst. An organozirconium compound is admixed with the polymer thus obtained. The organozirconium compound is of the formula $ZrO_m(OCOR')_n(OR'')_{p-n}$ where R' and R'' are independently selected from the group consisting of alkyl and cycloalkyl having 1-20 carbon atoms, and m = 0 or 1, provided that when m = 0, p is 4 and n is 0-4, and when m = 1, p is 2 and n = 0-2. Any hydrocarbon solvent and other volatile matter are then separated and a composition comprising said high molecular weight polymer is recovered. Alternatively the organozirconium compound may be blended with the polymer subsequent to the polymerization process. Examples of the high molecular weight polymers of alpha-olefins are homopolymers of ethylene, copolymers of ethylene with alpha-olefin homologues thereof, polypropylene and polybutene.

12 Claims, No Drawings

COLOR OF POLYMERS

The present invention relates to the colour of high molecular weight polymers, especially polymers of alpha-olefins. In particular, the present invention relates to the colour of polymers obtained from a process for the polymerization of alpha-olefins, especially ethylene or mixtures of ethylene and alpha-olefin homologues thereof, in which the polymerization catalyst contains titanium.

High molecular weight polymers, especially polymers of alpha-olefins, for example, homopolymers of ethylene, propylene or butene and copolymers of ethylene with alpha-olefin homologues thereof, are used in large volumes for a wide variety of end uses, for example, in the form of film, fibres, moulded or thermoformed articles, pipe and/or coatings.

Processes for the preparation of polymers of alpha-olefins are known. Such processes include processes in which the monomers are polymerized in the presence of a coordination catalyst, for example, a catalyst comprising a compound of a transition metal belonging to Groups IVB-VIB of the Periodic Table and an organometallic compound of a metal belonging to Groups I-IIIA of the Periodic Table. For instance, a preferred process for the polymerization of ethylene, optionally in the presence of its alpha-olefin homologues, is the high temperature or "solution" polymerization process, an example of which is described in Canadian Pat. No. 660 869 of A. W. Anderson, E. L. Fallwell and J. M. Bruce, which issued Apr. 9, 1963. In a solution process the process parameters are selected in such a way that both the monomer and polymer are soluble in the reaction medium. Solution processes are also discussed in U.S. patent application Ser. No. 824,352 of V. G. Zboril, filed Jan. 23, 1986.

The polymerization reaction in a process for polymerization of alpha-olefins is normally terminated by addition of a so-called "deactivator". If the deactivated catalyst remains in the polymer, the deactivator and deactivated catalyst residues must not cause problems in the separation of polymer from solvent and unreacted monomers, in the processing of the polymer obtained and in the resultant fabricated articles. Moreover, the polymer must have commercially-acceptable colour, odour and toxicity properties. It is particularly difficult to prevent degradation of the deactivator, generation of coloured species, reaction of catalyst residues with antioxidants and other stabilizers and the like, all of which tend to occur especially when polymer containing deactivator, catalyst residues, antioxidants and other additives are subjected to high temperatures during manufacture of the polymer and/or fabrication of articles from the polymer.

Coordination catalysts may be deactivated by contacting the polymerization mixture with a solution of a salt of an alkaline earth metal or zinc and an aliphatic monocarboxylic acid dissolved in the hydrocarbon solvent used in the polymerization process, as is disclosed in Canadian Pat. No. 1 165 499 of V. G. Zboril, which issued Apr. 10, 1984. Coordination catalysts, especially titanium-based coordination catalysts, may also be deactivated by sequentially contacting the polymerization mixture with a nitrogenous base, optionally in the form of an aqueous solution, water, carbon dioxide, carbon monoxide, dialkyl carbonate or dioxolones, and then a solution of a salt of an alkaline earth metal or zinc and aliphatic monocarboxylic acid dissolved in a hydrocarbon solvent, as is disclosed in Canadian Pat. No. 1 173 599 of M. A. Hamilton, D. A. Harbourne and V. G. Zboril, which issued Aug. 28, 1984, U.S. patent application Ser. No. 824,354 of D. J. Mitchell and V. G. Zboril, filed Jan. 23, 1986 and U.S. patent application Ser. No. 824,353 of V. G. Zboril and R. A. Zelonka, filed Jan. 23, 1986.

It has now been found that the colour of the polymer, especially polymer obtained from a process for the polymerization of alpha-olefins, may be improved by admixing the polymer with an organozirconium compound.

Accordingly, the present invention provides a polymerization process for the preparation of high molecular weight polymers selected from the group consisting of homopolymers of ethylene or alpha-olefin homologues thereof and copolymers of ethylene with alpha-olefin homologues thereof, said process comprising feeding monomer and a coordination catalyst to a reactor, said catalyst being a titanium-based coordination catalyst, polymerizing said monomer at a temperature of up to 320° C., deactivating the catalyst and admixing with the resultant polymer an organozirconium compound selected from the compounds of the formula $ZrO_m(OCOR')_n(OR'')_{p-n}$ where $R'$ and $R''$ are independently selected from the group consisting of alkyl and cycloalkyl having 1–20 carbon atoms, and $m=0$ or 1, provided that when $m=0$, $p$ is 4 and $n$ is 0–4, and when $m=1$, $p$ is 2 and $n=0-2$, separating volatile matter therefrom and recovering a composition comprising said high molecular weight polymer.

In a preferred embodiment of the process of the present invention, the process comprises feeding monomer, a coordination catalyst and an inert hydrocarbon solvent to the reactor, polymerizing said monomer at a temperature of up to 320° C., deactivating the catalyst in the solution so obtained and admixing said organozirconium compound therewith, separating the hydrocarbon solvent and other volatile matter from the resultant solution and recovering said composition. In particular, the process is a solution polymerization process.

In another embodiment, the catalyst is deactivated by admixing therewith a solution of a salt of an alkaline earth metal or zinc and aliphatic monocarboxylic acid dissolved in hydrocarbon solvent.

In yet another embodiment, the recovery of the composition comprising said high molecular weight polymer includes the step of subjecting the polymer to the influence of steam.

In a further embodiment, the organozirconium compound is admixed with and added with the solution of the salt of alkaline earth metal or zinc.

In a still further embodiment, the monocarboxylic acid is a $C_8$–$C_{10}$ carboxylic acid and the alkaline earth metal is calcium.

The present invention also provides a composition comprising a high molecular weight polymer selected from the group consisting of homopolymers of ethylene or alpha-olefin homologues thereof and copolymers of ethylene with alpha-olefin homologues thereof, an antioxidant and an organozirconium compound, said antioxidant being a hindered phenolic antioxidant and said organozirconium compound being selected from compounds of the formula $ZrO_m(OCOR')_n(OR'')_{p-n}$ where $R'$ and $R''$ are independently selected from the group consisting of alkyl and cycloalkyl having 1–20 carbon atoms and m=0 or 1, provided that when m=0, p is 4 and n is 0-4 and when m=1, p is 2 and n=0-2.

The present invention is directed to a polymerization process for the preparation of high molecular weight polymers of alpha-olefins and to compositions of high molecular weight polymers of alpha-olefins. In particular the polymers are homopolymers of ethylene and alpha-olefin homologues thereof, for example, propylene, and butene, or copolymers of ethylene with alpha-olefin homologues thereof, especially such alpha-olefins having 4 to 12 carbon atoms i.e. $C_4$–$C_{12}$ alpha-olefins, including bicyclic alpha-olefins, examples of which are butene-1, hexene-1, octene-1 and bicyclo-(2,2,1)2-heptene. In addition cyclic endomethylenic dienes may be fed to the process with the ethylene or mixtures of ethylene and $C_3$–$C_{12}$ alpha-olefin, as is described in Canadian Pat. No. 980 498 of C. T. Elston, which issued Dec. 23, 1975.

In a polymerization process of the present invention monomer, a coordination catalyst and optionally inert hydrocarbon solvent are fed to a reactor. Coordination catalysts are known, and if the process is a solution polymerization process, include those described in the aforementioned Canadian Pat. No. 660 869, in Canadian Pat. Nos. 1 171 065 of V. G. Zboril, M. A. Hamilton and R. W. Rees and 1 171 066 of V. G. Zboril and M. A. Hamilton, both of which issued July 17, 1984, in Canadian Pat. No. 119 154 of A. N. Mollison and V. G. Zboril, which issued Mar. 2, 1982 and in U.S. patent application Ser. No. 625,225 of M. A. Hamilton, D. A. Harbourne, C. G. Russell, V. G. Zboril and R. Mulhaupt, filed June 27, 1984, now abandoned. The latter coordination catalysts are titanium-based catalysts, especially titanium-based or titanium/vanadium-based catalysts in which 20-100% of the transition metal is titanium. The preferred monomer is ethylene or a mixture of ethylene and one or more of the alpha-olefin homologues thereof.

A number of different types of polymerization processes are known, including gas-phase or fluidized bed processes, slurry processes and high pressure processes that use coordination catalysts. In a preferred embodiment the process of the present invention is a solution polymerization process and the temperature is in the range 105°-310° C., the lower temperature being above the lowest solubilization temperature of the polymer in a solution polymerization process, as will be understood by those skilled in the art of solution polymerization processes. In preferred embodiments the pressures used in the process of the present invention are less than 25 MPa e.g. those known for solution polymerization processes, and especially in the range of about 4-25 MPa; in a solution polymerization process the pressure and temperature are controlled so that both the unreacted monomers and the polymers formed remain in solution.

The hydrocarbon solvent used in the polymerization of alpha-olefins is a hydrocarbon solvent that is inert with respect to the coordination catalyst. Such solvents are known and include hexane, heptane, octane, cyclohexane, methylcyclohexane and hydrogenated naphtha. The solvent used in the polymerization process is preferably also used in the preparation of the coordination catalyst. The hydrocarbon solvent is the major component of the polymerization mixture fed to the reactor, usually comprising at least 60% by weight of the reaction mixture. In a solution polymerization process, the monomer is dissolved in the solvent.

The mixture that exits from the polymerization reactor comprises polymer, unreacted monomers, coordination catalyst some of which remains in an active state, and hydrocarbon solvent. A deactivator is added to the mixture to terminate the polymerization process. In the process of the present invention the mixture passing from the polymerization reactor may be treated with a deactivating agent in more than one step.

Deactivating agents are known. If the process is a solution polymerization process, the deactivator may be a solution of a non-stoichiometric salt of an alkaline earth metal or zinc and an aliphatic monocarboxylic acid dissolved in hydrocarbon solvent, especially a salt having excess acid to facilitate solubility. In particular the hydrocarbon solvent used for the deactivator is the same as the solvent used in the polymerization process. If a different solvent is used, it must be compatible with the solvent used in the polymerization process, not cause precipitation of any component of the polymerization mixture and not cause adverse effects on the solvent recovery system associated with the polymerization process. The salt is preferably dissolved in the solvent in order to obtain intimate contact between the deactivator and any remaining active catalyst and to obtain uniform dispersion of the deactivator and catalyst residues i.e. the form of the catalyst after deactivation, throughout the polymer, thereby facilitating the production of polymer of uniform properties.

In the above salt of the deactivator solution, the metal is an alkaline earth metal or zinc, especially magnesium or calcium. The remainder of the salt is derived from at least one aliphatic monocarboxylic acid, especially such an acid having 6 to 20 carbon atoms. In a preferred embodiment the acid has 8 to 12 carbon atoms. The acid is preferably a branched chain aliphatic acid although straight chain aliphatic acids and cycloaliphatic acids may be used. Moreover, the acids may be saturated or unsaturated acids. However, the acid should be such that the salt thereof that is used in the process of the present invention is soluble in the hydrocarbon solvent used therein. In preferred embodiments the salt is calcium 2-ethyl hexanoate, calcium naphthenate, calcium iso-stearate or the like.

In a preferred embodiment of the process, deactivation of the reaction mixture is carried out in two steps, the second of which is admixing the reaction mixture with the solution of the non-stoichiometric salt of an alkaline earth metal or zinc described hereinabove. In such an embodiment the first deactivating agent may be a minor amount of water or of a nitrogenous base. The nitrogenous base is of the formula $NR^1R^2R^3$ where $R^1$, $R^2$ and $R^3$ are independently selected from the group consisting of H, saturated alkyls having 1-20 carbon atoms and —$SiR^4R^5R^6$ where each of $R^4$, $R^5$ and $R^6$ is independently selected from saturated alkyls having 1-20 carbon atoms, with the proviso that the nitrogenous base does not contain more than two —$SiR^4R^5R^6$ groups. Preferably, each of $R^1$, $R^2$ and $R^3$ is H i.e. the nitrogenous base in ammonia. In a preferred embodiment, the nitrogenous base is in the form of an aqueous solution in which the ratio of water to nitrogenous base in not greater than 5. In embodiments, at least one of $R^1$, $R^2$ and $R^3$ is methyl or ethyl. Alternatively, the first deactivator may be carbon dioxide, carbon monoxide, a dialkyl carbonate having 3-20 carbon atoms, especially dimethyl carbonate or diethyl carbonate, or a dioxolone which has 3-20 carbon atoms. The preferred dioxolone is 1,3-dioxolan-2-one. Mixtures of deactivators may be used.

The amount of first deactivating agent added should not be more than 2.5 moles of deactivating agent per mole of halogen plus alkyl radicals in the coordination catalyst; as used herein a mole of a catalyst component such as diethyl aluminum chloride, as used in the preparation of the catalyst, is deemed to contain two equivalents of ethyl groups and one equivalent of chlorine, the sum of such equivalents being referred to as "moles of halogen plus alkyl groups", and the calculation of the amount of deactivating agent is to be made on such a basis. Preferably 0.25–1.5 moles are added per mole of halogen plus alkyl radicals in the catalyst precursors.

Subsequent to the deactivation of the reaction mixture, the solution obtained is admixed with an organozirconium compound selected from compounds of the formula $ZrO_n(OCOR')_m(OR'')_{p-n}$ where $R'$ and $R''$ are independently selected from the group consisting of alkyl and cycloalkyl and having 1–20 carbon atoms, and $m=0$ or 1, provided that when $m=0$, p is 4 and n is 0–4, and when $m=1$, p is 2 and $n=0-2$.

Preferably, when $m=0$, n is 0 and $R''$ is propyl or butyl and when $m=1$, $n=2$ and $R'$ is neo—$C_9H_{19}$ or 2-ethyl-$C_5H_{11}$—. The aliphatic monocarboxylic acids of such zirconium salts have 6 to 20 carbon atoms, preferably 8 to 12 carbon atoms. The acid is preferably a branched chain aliphatic acid although straight chain aliphatic acids and cycloaliphatic acids may be used; the acids may be saturated or unsaturated acids. The organozirconium compound must be at least partially soluble in the hydrocarbon solvent used in the polymerization process. Intimate mixing of polymer and organozirconium compound is important in order to obtain polymer having uniform properties.

The organozirconium compound is intended to act as an agent that improves the colour of the polymer subsequently obtained, especially the yellowness of the polymer, rather than as a deactivating agent. It is preferred that the yellowness of the polymer be at a very low level.

The addition of the solution of the salt of the carboxylic acid as deactivator and the addition of the organozirconium compound may be combined as a single step. However, the organozirconium compound should not be added prior to deactivation of the catalyst, especially because such addition may result in isomerization of the higher alpha-olefin and/or polymer of poor colour. It may be preferable to admix the organozirconium compound with the antioxidant, especially phenolic antioxidant, for the polymer prior to addition thereof to the polymer.

The amount of organozirconium compound should be at least 10 ppm and especially 10–200 ppm in the polymer. However, economic considerations may be a prime factor in determining the upper limit used in the polymer.

In the process of the present invention the thus deactivated and treated polymerization mixture is fed to a separator, which may be a multistage separator, to separate unreacted monomer, hydrocarbon solvent and any other volatile matter from the polymer. Steps are normally not taken to remove catalyst residues and/or the organozirconium compound from the polymer using adsorbents or other techniques. After separation from solvent and unreacted monomer, the polymer may be extruded into water and cut into pellets or other suitable comminuted shapes.

The recovered polymer may then be treated with saturated steam, optionally admixed with air, at atmospheric pressure to, for example, reduce the amount of volatile materials and improve polymer colour. The treatment may be carried out for about 1 to 16 hours, following which the polymer may be dried and cooled with a stream of air for 1 to 4 hours. Pigments, antioxidants and other additives may be added to the polymer either before or after the polymer is initially formed into pellets or other comminuted shapes.

The antioxidant incorporated into polymer obtained from the process of the present invention may, in embodiments, be a single antioxidant e.g. a hindered phenolic antioxidant, or a mixture of antioxidants e.g. a hindered phenolic antioxidant combined with a secondary antioxidant e.g. a phosphite. Both types of antioxidant are known in the art. For example, the ratio of phenolic antioxidant to secondary antioxidant may be in the range 0.25:1 to 1:1 with the total amount of antioxidant being in the range of 400 to 2000 ppm.

The organozirconium compound may be admixed with the polymer subsequent to the recovery of the polymer from the process used for the manufacture of the polymer. For instance, a concentrate of organozirconium compound in an alpha-olefin polymer may be formed and that concentrate may be physically admixed or blended with alpha-olefin polymer. Alternatively, the concentrate or a solution or suspension of organozirconium compound in an inert carrier may be metered into an extruder through which polymer of alpha-olefin is being conveyed; the resultant blend may be formed into pellets or other comminuted shapes, or formed into a fabricated article.

The present invention provides compositions of high molecular weight polymers of alpha-olefins, organozirconium compound and hindered phenolic antioxidant. The antioxidant may be incorporated into the polymer during manufacture thereof and/or subsequent to such manufacture, for instance using the techniques described above. Other additives may also be incorporated into the compositions, as is known.

The polymers produced by the process of the present invention are capable of being fabricated into a wide variety of articles, as is known for homopolymers of ethylene, propylene and butene and copolymers of ethylene with its alpha-olefin homologues.

Unless otherwise noted, in the examples hereinafter the following procedures were used:

The reactor was a 95 ml (depth=15.1 mm, diameter=88.9 mm) pressure vessel fitted with a six-bladed agitator having a diameter of 66.7 mm, a heating jacket, pressure and temperature controllers, two feed lines and an outlet line. The feed lines were located adjacent to the tips of the agitator blades while the outlet line was adjacent to the centre of the agitator. The catalyst precursors and other ingredients were prepared as solutions in cyclohexane which had been purified by being passed through a silica gel bed, stripped with nitrogen and passed through another silica gel bed followed by beds of 4X molecular sieve and of alumina. The monomer(s) was metered directly into the reactor. The rates of feed of the first and second components of the catalyst were adjusted to produce the desired conditions in the reactor.

The reactor effluent was passed through 4.57 mm ID tubing heated to a temperature of 296° C. prior to injection of the first deactivator. The hold-up time in the tubing was about 0.2 min. After injection of the first deactivator, the resultant stream was passed through a further length of 4.57 mm ID tubing, which was heated to 320° C., for a hold-up time of about 2.8 min. A second deactivator was then injected into the stream. The deactivated polymer stream thus obtained was maintained at 320° C. for about 15 seconds and then flashed into the barrel of a ram extruder heated to about 220° C., the gaseous matter obtained being removed from the extruder. The molten polymer obtained was periodically extruded into a mould having a depth of 1 mm and a diameter of 40 mm and then rapidly cooled to ambient temperature. The plaques thus obtained were then stripped for eight hours with a mixture of saturated steam and air (7:1, by volume) at atmospheric pressure and then dried for 4 hours using air at 100° C. The colour of the plaques was then measured on a Hunter TM L,a,b colourimeter, the measurement being on four plaques stacked in a holder having a black background.

The present invention is illustrated by the following examples. The solvent used in the examples was cyclohexane.

EXAMPLE I

The catalyst was prepared by in-line mixing of (i) a solution of titanium tetrachloride (0.625 mmoles/liter) and vanadium oxytrichloride (0.625 mmoles/liter) in cyclohexane with (ii) a solution of 1.9 mmoles/liter of diethylaluminum chloride in cyclohexane, the atomic ratio of aluminum to titanium plus vanadium being 1.67:1. After about 30 seconds, a stream of hot cyclohexane was injected into the catalyst mixture, the resultant stream having a temperature of 210° C. The stream was maintained at this temperature for one minute.

The catalyst obtained using the above procedure was fed into the reactor. The co-catalyst of diethyl trimethyl siloxalane was also fed to the reactor. The co-catalyst was used as a 4 mmole/liter solution in cyclohexane and the rate of feed to the reactor was such that the ratio of aluminum of the co-catalyst to the titanium plus vanadium of the catalyst was 4:1. The reactor effluent was treated as described hereinbefore.

The first deactivator was carbon dioxide which was injected as a 40 mmole/liter solution in cyclohexane. The rate of injection was such that the molar ratio of carbon dioxide to chlorine plus alkyl radicals in the catalyst was 1.56:1. The second deactivator was a non-stoichiometric mixture of calcium caprylate/caprate injected as a 6 mmole/liter solution in cyclohexane, the ratio of calcium to chlorine plus alkyl radicals in the catalyst being 0.35:1.

An antioxidant solution containing 2.76 g/liter of Irganox TM 1076 hindered phenolic antioxidant and 1.84 g/liter of Irgafos TM 168 phosphite antioxidant in cyclohexane was injected into the polymer solution shortly before reduction in pressure in the process. The rate of injection of 1.2 ml/min. resulted in 1840 ppm of combined antioxidants in the polymer. In a series of runs, as reported in Table I, different amounts of tetra n-propoxy zirconium were added to the antioxidant solution. Table I reports the results obtained, in the order in which the runs were made. The polymer colour results are the average of measurements made on eight plaques.

The results obtained were as follows:

TABLE I

| Run No. | Zirconium Compound* | Polymer Colour | |
|---|---|---|---|
| | | L | b |
| 1 | 0 | 75.7 | −1.36 |
| 2 | 56 | 74.3 | −1.39 |
| 3 | 110 | 74.6 | −1.97 |
| 4 | 220 | 75.7 | −1.85 |
| 5 | 560 | 75.8 | −1.36 |
| 6 | 0 | 75.6 | −1.05 |

*ppm of zirconium in the polymer.

The results show a significant improvement in the colour of the polymer, as measured by yellowness, when 50–250 ppm of zirconium are added to the polymer.

EXAMPLE II

The procedure of Example I was repeated except that zirconyl neo-decanoate was used as the zirconium Compound.

The results obtained were as follows:

TABLE II

| Run No. | Zirconium Compound* | Polymer Colour | |
|---|---|---|---|
| | | L | b |
| 7 | 0 | 75.7 | −1.04 |
| 8 | 70 | 75.7 | −1.16 |
| 9 | 140 | 75.4 | −1.61 |
| 10 | 360 | 75.3 | −1.95 |

*ppm of zirconium in the polymer.

The results show that the type of organozirconium compound may have an effect on the optimum amount of zirconium required to improve the colour (yellowness) of the polymer, the amount of zirconyl neo-decanoate being higher than tetra-n-propoxy zirconium for the same improvement in colour.

EXAMPLE III

A series of simulated tests were made to assess interactions between catalyst and antioxidant in a polymerization process of the type generally described in Example I. The apparatus used was a 50 ml flask having a heating mantle, a reflux condenser and a stainless steel sparging tube passing through the condenser to a location adjacent to the bottom of the flask.

25 ml of hexadecane was added to the flask and sparged for 10 minutes with helium. The ingredients of the run were then added in the order shown in Table III below. After a further 10 minutes, the flask was heated to the boiling point of its contents, maintained at that temperature for two minutes and then cooled rapidly. The heating and cooling periods were approximately 10 and 5 minutes respectively. The helium sparge was maintained throughout the run.

The colour of the solution in the flask was assessed using a scale of from 1 (no colour change) to 5 (deep brown colour).

The results obtained were as follows:

TABLE III

| Run No. Ingredients | 11 | 12 | 13 | 14 | 15 | 16 | 17 | 18 |
|---|---|---|---|---|---|---|---|---|
| Irganox antioxidant (g) | 0 | 0.05 | 0 | 0 | 0.05 | 0.05 | 0.05 | 0.05 |
| Ca 2-ethyl-hexanoate (5% Ca) (g) | 0 | 0 | 0.25 | 0 | 0.25 | 0 | 0.25 | 0.25 |
| Tetra n-propoxy | 0 | 0 | 0 | 0.25 | 0 | 0.05 | 0.05 | 0.05 |

TABLE III-continued

| Run No. Ingredients | 11 | 12 | 13 | 14 | 15 | 16 | 17 | 18 |
|---|---|---|---|---|---|---|---|---|
| titanium (g) Tetra n-propoxy zirconium (g) | 0 | 0 | 0 | 0 | 0 | 0 | 0 | 0.25 |
| Colour | 1 | 1 | 1 | 1 | 2 | 2 | 5 | 2 |

This example illustrates the improvement in colour achieved on addition of a zirconium compound.

I claim:

1. Polymerization process for the preparation of high molecular weight polymers selected from the group consisting of homopolymers of ethylene or alpha-olefin homologues thereof and copolymers of ethylene with alpha-olefin homologues thereof, said process comprising feeding monomer and a coordination catalyst to a reactor, said catalyst being a titanium-based coordination catalyst, polymerizing said monomer at a temperature of up to 320° C., deactivating the catalyst and admixing with the resultant polymer an organozirconium compound selected from the compounds of the formula $ZrO_m(OCOR')_n(OR'')_{p-n}$ where R' and R' are independently selected from the group consisting of alkyl and cycloalkyl having 1-20 carbon atoms, and m=0 or 1, provided that when m=0, p is 4 and n is 0-4, and when m=1, p is 2 and n=0-2, separating volatile matter therefrom and recovering a composition comprising said high molecular weight polymer.

2. The process of claim 1 which comprises feeding monomer, a coordination catalyst and an inert hydrocarbon solvent to the reactor, polymerizing said monomer at a temperature of up to 320° C., deactivating the catalyst in the solution so obtained and admixing said organozirconium compound therewith, separating the hydrocarbon solvent and other volatile matter from the resultant solution and recovering said composition.

3. The process of claim 2 in which the process is a solution polymerization process.

4. The process of claim 3 in which the catalyst is deactivated with a solution of a salt of an alkaline earth metal or zinc and aliphatic monocarboxylic acid dissolved in hydrocarbon solvent.

5. The process of claim 4 in which the catalyst is deactivated by sequentially admixing therewith (a) a minor amount of a deactivating agent selected from the group consisting of water, a nitrogenous base, carbon dioxide, carbon monoxide, dialkyl carbonate and dioxolones, and mixtures thereof, followed by (b) a solution of a salt of an alkaline earth metal or zinc and aliphatic monocarboxylic acid dissolved in hydrocarbon solvent, and (c) an organozirconium compound, said nitrogenous base being of the formula $NR^1R^2R^3$, where $R^1$, $R^2$ and $R^3$ are independently selected from the group consisting of H, saturated alkyls having 1-20 carbon atoms and $-SiR^4R^5R^6$ where each of $R^4$, $R^5$ and $R^6$ is independently selected from saturated alkyls having 1-20 carbon atoms, with the proviso that the nitrogenous base does not contain more than two $-SiR^4R^5R^6$ groups, said dialkyl carbonate having 3-20 carbon atoms and said dioxolones having 3-20 carbon atoms.

6. The process of claim 5 in which the organozirconium compound of step (c) is admixed with and added with the solution of step (b).

7. The process of claim 4 in which m=0.

8. The process of claim 4 in which m=1.

9. The process of claim 4 in which the polymerization temperature is in the range 105°-310° C.

10. The process of claim 4 in which the aliphatic monocarboxylic acid of the second deactivator has 6 to 20 carbon atoms.

11. The process of claim 4 in which the alkaline earth metal is calcium.

12. The process of claim 1 in which the recovery of the polymer includes the step of subjecting the polymer to the influence of steam.

* * * * *